United States Patent
Utsugi (10) Patent No.: US 8,155,472 B2
(45) Date of Patent: Apr. 10, 2012

(54) IMAGE PROCESSING APPARATUS, CAMERA, IMAGE PROCESSING PROGRAM PRODUCT AND IMAGE PROCESSING METHOD

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 845 days.

(21) Appl. No.: 12/222,652

(22) Filed: Aug. 13, 2008

(65) Prior Publication Data

US 2009/0052801 A1    Feb. 26, 2009

(30) Foreign Application Priority Data

Aug. 21, 2007   (JP) ................. 2007-214659

(51) Int. Cl.
  *G06K 9/40*  (2006.01)
(52) U.S. Cl. ................... 382/264; 382/275
(58) Field of Classification Search .......... 382/264, 382/275

See application file for complete search history.

(56) References Cited

U.S. PATENT DOCUMENTS

| | | | | |
|---|---|---|---|---|
| 6,148,115 A | * | 11/2000 | Mackinnon et al. | 382/266 |
| 6,885,477 B2 | * | 4/2005 | Karidi et al. | 358/3.27 |
| 7,853,095 B2 | * | 12/2010 | Inada et al. | 382/260 |
| 2002/0101618 A1 | * | 8/2002 | Endo | 358/3.22 |
| 2006/0262210 A1 | * | 11/2006 | Smith et al. | 348/308 |
| 2007/0103601 A1 | * | 5/2007 | Izumi | 348/687 |
| 2008/0239353 A1 | * | 10/2008 | Hori et al. | 358/1.9 |

FOREIGN PATENT DOCUMENTS

| | | |
|---|---|---|
| JP | A-61-128680 | 6/1986 |
| JP | A-06-006685 | 1/1994 |
| JP | A-10-243297 | 9/1998 |
| JP | A-2006-148414 | 6/2006 |

OTHER PUBLICATIONS

Jan. 17, 2012 Office Action issued in JP Application No. 2007-214659 (with English translation).

* cited by examiner

*Primary Examiner* — Jon Chang
(74) *Attorney, Agent, or Firm* — Oliff & Berridge, PLC (57) ABSTRACT

An image processing apparatus, includes: an information acquisition unit that obtains position information indicating a position of a first pixel group made up with pixels set along a predetermined direction among a plurality of pixels constituting an image; a smoothing processing unit that executes smoothing processing on pixel values indicated at the pixels in the first pixel group; and a control unit that controls the smoothing processing unit so that the smoothing processing unit executes the smoothing processing differently when using pixel values indicated at least at some pixels in the first pixel group during the smoothing processing and when using pixel values indicated at least at some pixels in a second pixel group among the plurality of pixels during the smoothing processing, the second pixel group being different from the first pixel group.

16 Claims, 7 Drawing Sheets

IMAGE PROCESSING APPARATUS, CAMERA, IMAGE PROCESSING PROGRAM PRODUCT AND IMAGE PROCESSING METHOD

INCORPORATION BY REFERENCE

The disclosure of the following priority application is herein incorporated by reference:

Japanese Patent Application No. 2007-214659 filed Aug. 21, 2007.

BACKGROUND OF THE INVENTION

1. Field of the Invention

The present invention relates to an image processing apparatus, a camera, an image processing program product and an image processing method.

2. Description of Related Art

There are technologies known in the related art such as those disclosed in Japanese Laid Open Patent Publication No. H06-6685 and Japanese Laid Open Patent Publication No. S61-128680, through which image data are corrected in order to reduce the adverse effect of noise contained in the image data. For instance, a max-min filter may be used to correct image data in which spike noise incongruous with the data at surrounding pixels is present. Image data are corrected through the use of the max-min filter by determining the largest value and the smallest value indicated by pixel signals at pixels surrounding the correction target coordinate point and correcting the pixel signal at the correction target coordinate point so as to adjust its value toward the largest value or the smallest value.

SUMMARY OF THE INVENTION

There is an issue yet to be effectively addressed in the technologies in the related art in that full noise correction cannot be achieved if a nearby pixel signal contains noise similar to the noise present in the pixel signal at the correction target coordinate point.

According to the first aspect of the present invention, an image processing apparatus comprises: an information acquisition unit that obtains position information indicating a position of a first pixel group made up with pixels set along a predetermined direction among a plurality of pixels constituting an image; a smoothing processing unit that executes smoothing processing on pixel values indicated at the pixels in the first pixel group; and a control unit that controls the smoothing processing unit so that the smoothing processing unit executes the smoothing processing differently when using pixel values indicated at least at some pixels in the first pixel group during the smoothing processing and when using pixel values indicated at least at some pixels in a second pixel group among the plurality of pixels during the smoothing processing, the second pixel group being different from the first pixel group.

According to the second aspect of the present invention, in the image processing apparatus according to the first aspect, it is preferred that the second pixel group is in close proximity to the first pixel group.

According to the third aspect of the present invention, in the image processing apparatus according to the first aspect, it is preferred that the smoothing processing unit assigns either an nth ($n \geq 2$) largest pixel value among pixel values indicated at pixels in the first pixel group present near a target pixel undergoing the smoothing processing or a largest pixel value among pixel values indicated at pixels in the second pixel group, present near the target pixel undergoing the smoothing processing whichever assumes a larger value, as a reference maximum value, and corrects a pixel value at the target pixel to a smaller value if the pixel value indicated at the target pixel is larger than the reference maximum value.

According to the fourth aspect of the present invention, in the image processing apparatus according to the third aspect, it is preferred that the smoothing processing unit corrects a pixel value at the target pixel to a smaller value if the pixel value at the target pixel undergoing the smoothing processing is smaller than a sum of the reference maximum value and a predetermined value.

According to the fifth aspect of the present invention, in the image processing apparatus according to the first aspect, it is preferred that the smoothing processing unit assigns either an nth ($n \geq 2$) smallest pixel value among pixel values indicated at pixels in the first pixel group present near a target pixel undergoing the smoothing processing or a smallest pixel value among pixel values indicated at pixels in the second pixel group present near the target pixel undergoing the smoothing processing whichever assumes a smaller value, as a reference minimum value, and corrects a pixel value at the target pixel to a larger value if the pixel value indicated at the target pixel undergoing the smoothing processing is smaller than the reference minimum value.

According to the sixth aspect of the present invention, in the image processing apparatus according to the fifth aspect, it is preferred that the smoothing processing unit corrects a pixel value at the target pixel undergoing the smoothing processing to a larger value if the pixel value at the target pixel undergoing the smoothing processing is larger than a difference obtained by subtracting a predetermined value from the reference minimum value.

According to the seventh aspect of the present invention, in the image processing apparatus according to the fourth aspect, it is preferred that the predetermined value is set based upon noise data with regard to noise occurring in an image-capturing device that captures the image.

According to the eighth aspect of the present invention, in the image processing apparatus according to the seventh aspect, it is preferred that the smoothing processing unit adjusts the predetermined value based upon temperature information obtained when the image is captured.

According to the ninth aspect of the present invention, in the image processing apparatus according to the first aspect, it is preferred that the smoothing processing unit executes the smoothing processing if a local mean calculated based upon a pixel value at a target pixel undergoing the smoothing processing and pixel values at pixels present near the target pixel in the image is smaller than a predetermined decision threshold value.

According to the tenth aspect of the present invention, in the image processing apparatus according to the ninth aspect, it is preferred that the decision threshold value is set based upon noise data with regard to noise occurring in an image-capturing device that captures the image.

According to the eleventh aspect of the present invention, in the image processing apparatus according to the first aspect, it is preferred that the plurality of pixels each hold either data representing first color component data or data representing second color component data different from the first color component data and the smoothing processing unit executes the smoothing processing by using data representing each color component.

According to the twelfth aspect of the present invention, a camera equipped with an image processing apparatus according to the first aspect.

According to the thirteenth aspect of the present invention, a computer-readable computer program product containing an image processing program, with the image processing program which comprises: a first processing instruction for obtaining position information indicating a position of a first pixel group made up with pixels disposed along a predetermined direction among a plurality of pixels constituting an image; a second processing instruction for obtaining a first reference value by using pixel values indicated at least at some pixels in a first pixel group; a third processing instruction for obtaining a second reference value by using pixel values indicated at least at some pixels in a second pixel group among the plurality of pixels, which is different from the first pixel group; and a fourth processing instruction for smoothing a pixel value in the first pixel group by using the first reference value and the second reference value.

According to the fourteenth aspect of the present invention, an image processing method comprises: obtaining position information indicating a position of a first pixel group made up with pixels disposed along a predetermined direction among a plurality of pixels constituting an image; obtaining a first reference value by using pixel values indicated at least at some pixels in the first pixel group; obtaining a second reference value by using pixel values indicated at least at some pixels in a second pixel group among the plurality of pixels, which is different from the first pixel group; and smoothing a pixel value in the first pixel group by using the first reference value and the second reference value.

DESCRIPTION OF PREFERRED EMBODIMENTS

Figure 1:
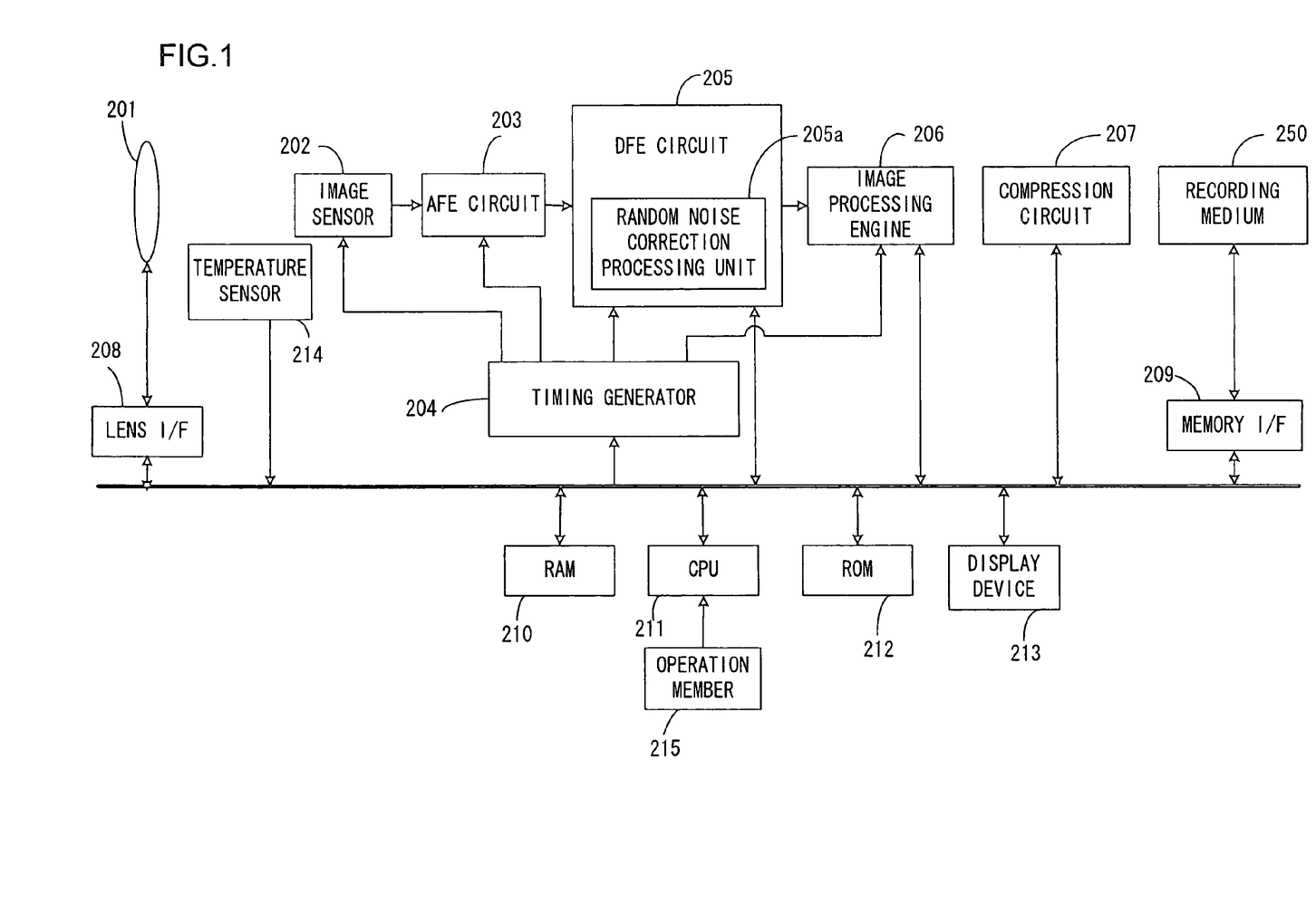
FIG. 1 is a block diagram illustrating the essential structure adopted in the electronic camera achieved in an embodiment of the present invention.

The following is a description of the best mode for carrying out the present invention, given in reference to the drawings. FIG. 1 is a block diagram illustrating the essential structure adopted in the electronic camera achieved in an embodiment of the present invention. A subject image is formed onto an image-capturing surface of an image sensor 202 via a photographic lens 201 shown in FIG. 1.

Information indicating the settings selected for the photographic lens 201 is obtained at a lens interface 208 in response to an instruction issued from a CPU 211 which is to be detailed later. The lens settings include the aperture value and the focal length. The image sensor 202 may be constituted with, for instance, a CMOS image sensor. The image sensor 202 captures the subject image and outputs analog image signals to an AFE (analog front end) circuit 203.

The AFE circuit 203 executes analog processing (such as signal amplification) on the analog image signals. The AFE circuit 203 includes a built-in A/D converter which converts the image signals having undergone the analog processing to digital image signals. The digital image signals are output to a DFE (digital front end) circuit 205. The DFE circuit 205 includes a random noise correction processing unit 205a, to be detailed later, which corrects the digital image signals.

An image processing engine 206 executes image processing on the corrected digital image signals. The image processing includes, for instance, contour enhancement, color temperature adjustment (white balance adjustment) and image signal format conversion. The image processing engine 206 also creates image data to be used to display an output image at a display device 213 based upon the image signals having undergone the image processing. At the display device 213, which may be constituted with, for instance, a liquid crystal display panel, the output image is brought up on display based upon the image data having been created.

A timing generator 204 individually provides drive signals to the image sensor 202, the AFE circuit 203, the DFE circuit 205 and the image processing engine 206. A compression circuit 207 executes image compression through which the digital image signals having undergone the image processing are compressed. A memory interface 209 executes access control for a recording medium 250 in response to an instruction issued from the CPU 211 as detailed later. The recording medium 250 is constituted with a detachable/attachable memory card in the electronic camera. An image file containing image data and attendant data is recorded into the recording medium 250.

A temperature sensor 214 is installed near the image sensor 202. The temperature sensor 214 outputs a temperature detection signal to the CPU 211. The CPU 211 executes specific arithmetic operations by using signals input thereto from various blocks and outputs control signals generated based upon the arithmetic operation results to the individual blocks. A RAM 210 is used to temporarily store data to undergo the image processing at the image processing engine 206, data having undergone the image processing at the image processing engine 206 and intermediate data currently undergoing the image processing, as well as functioning as a work memory of the CPU 211.

Programs executed by the CPU 211 are stored in the ROM 212. An operation member 215 includes operation switches of the electronic camera. The operation member 215 outputs to the CPU 211 an operation signal in response to a halfway press operation or a full press operation of a shutter button (not shown).

The following explanation focuses on the correction executed by the random noise correction processing unit 205a, which characterizes the electronic camera in the embodiment.

Figure 2:
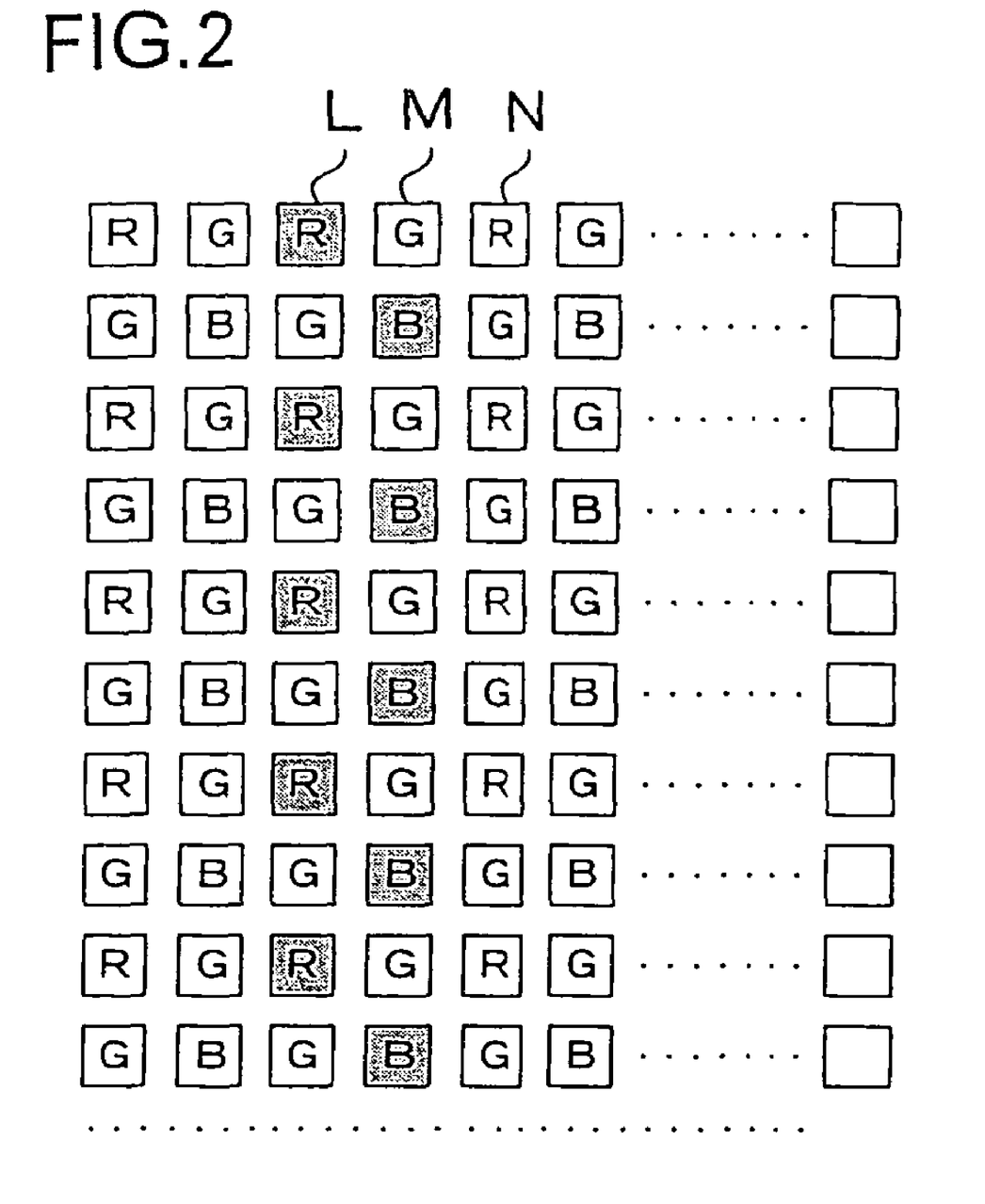
FIG. 2 presents an example of a matrix pattern with which the pixel sensors may be arrayed at the image sensor.

FIG. 2 presents an example of a matrix pattern with which the pixel sensors may be arrayed at the image sensor 202. FIG. 2 shows photo diodes alternately equipped with color filters R (red) and color filters G (green), disposed along column L. Along column M, photo diodes alternately equipped with color filters G (green) and color filters B (blue) are disposed. Column N assumes a color filter arrangement similar to that in column L.

FIG. 2 shows photo diodes each having a color filter R, a color filter G or a color filter B disposed thereat. The color filters R, G and B are disposed in the Bayer array in FIG. 2. This means that the image signals, each originating from one of the pixels and output from the image sensor 202, each hold information corresponding to one of the three color components, i.e., the R (red) color component, the G (green) color component and the B (blue) color component. Namely, a red color signal is output from a pixel corresponding to a color filter R, a green color signal is output from a pixel corresponding to a color filter G and a blue color signal is output from a pixel corresponding to a color filter B.

The following explanation is provided by assuming that spiking random noise (hereafter referred to as spike noise) is present in the R-color component signals from column L and the B color component signals from column M among the image signals output from the image sensor 202. Such a phenomenon may manifest if, for instance, an abnormality occurs in a common amplifier circuit used to amplify the R-color component signals in column L and the B color component signals in column M or a common abnormality occurs at the photo diodes. In FIG. 2, the positions of the pixels from which color component signals containing spike noise have been output are indicated through halftone shading.

When common spike noise is present in pixel signals output from specific pixel sensor columns at the image sensor 202 as described above, the intensity levels of the color components corresponding to these pixel signals increase (or decrease), resulting in very noticeable random noise manifesting as vertical lines in the output image. The random noise correction processing unit 205a executes arithmetic correction operation in order to suppress such linear noise. Namely, it corrects specific color component signals (e.g., R-color component signals) among the pixel signals in the pixel row corresponding to a pixel sensor column (e.g., column L) specified in advance.

A decision as to whether or not there is any likelihood of spike noise being present in the image signals is made based upon the results of measurement carried out at the time of manufacture of the electronic camera (or when the image sensor 202 is replaced). More specifically, an image is captured under conditions in which the imaging surface of the image sensor 202 is exposed at a uniform low brightness level and a standard deviation for pixel signal values is calculated for each pixel row based upon the image signals obtained through the imaging operation. Then, the mean of the pixel signal value standard deviations having been calculated in correspondence to all the pixel rows is calculated and assigned as a standard deviation for all the image signals from the electronic camera. Any pixel row with a pixel signal value standard deviation thereof exceeding a predetermined multiple (e.g., multiplied by a factor of 1.3) of the overall image signal standard deviation is judged to be a pixel row that may contain spike noise.

In the embodiment, a value obtained by multiplying the pixel signal value standard deviation (row) of the pixel row likely to contain spike noise by a predetermined factor (e.g., 4) is assigned as a decision threshold value th1. Under normal circumstances, shot noise tends to increase as the exposure increases, to result in a decrease in the ratio of spike noise. Accordingly, a pixel signal value corresponding to the exposure quantity at which the ratio of spike noise to all the noise becomes less than a predetermined value (e.g., 20%) is assigned as a decision threshold value th2. Information indicating pixel rows likely to contain spike noise such as those shown in FIG. 2 and the decision threshold values th1 and th2 are stored into the ROM 212 as electronic camera inherent information.

(Photographing Processing)

Figure 3:
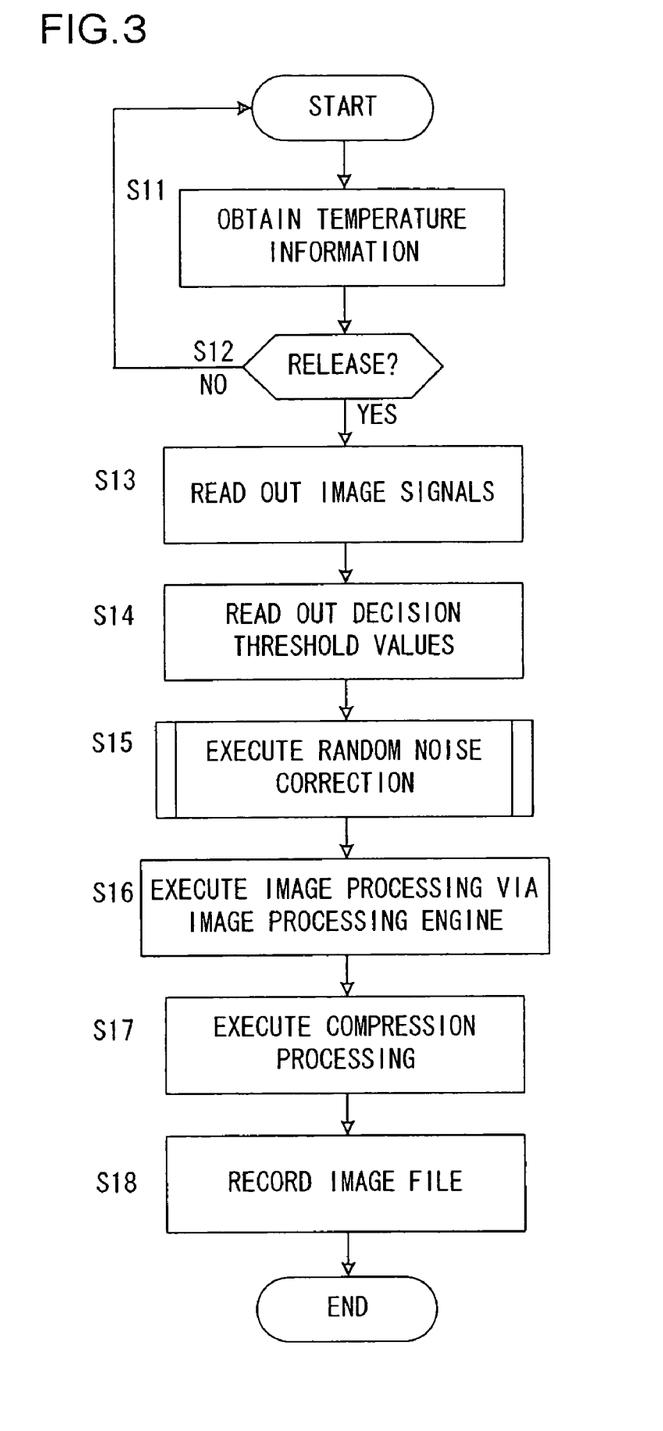
FIG. 3 presents a flowchart of the photographing processing during which random noise correction is executed.

FIG. 3 presents a flowchart of the photographing processing during which random noise correction is executed. As an operation signal indicating a halfway press operation of the shutter button (not shown) at the electronic camera is input thereto, the CPU 211 reads out the program which shall enable it to execute the processing shown in FIG. 3. In step S11 in FIG. 3, the CPU 211 reads out the temperature detection signal output from the temperature detection signal 214. It thus obtains temperature information pertaining to the image sensor 212.

In step S12, the CPU 211 makes a decision as to whether or not a release operation has been performed. The CPU 211 makes an affirmative decision if an operation signal indicating a full press operation of the shutter button has been input and, in this case, it executes a predetermined imaging operation. However, it makes a negative decision if no operation signal indicating a shutter button full press operation has been input and, in such a case, the processing returns to step S11.

In step S13, the CPU 211 issues a read instruction so as to read out image signals output from the image sensor 202. In more specific terms, it engages the timing generator 204 to input a drive signal to the image sensor 202 and, as a result, accumulated signals originating from the photo diodes selected via a MOS transistor (not shown) among the photo diodes arrayed along the pixel sensor columns are output to a column decoder (not shown) in response to the drive signal input to the image sensor. The accumulated signals are each obtained by converting the electrical charge accumulated at a given photo diode to a voltage. The accumulated signals thus output are converted to digital signals at the AFE circuit 203 and the digital signals are then output to the DFE circuit 205.

In step S14, the CPU 211 reads out the decision threshold value th1 and the decision threshold value th2 corresponding to temperature information from the ROM 212. The decision threshold values th1 and th2 are to be described in detail later. In step S15, the CPU 211 outputs a random noise correction instruction to the DFE circuit 205, thereby engaging the DFE circuit in the random noise correction. In response, the random noise correction processing unit 205a executes the arithmetic correction operation and the DFE circuit 205 outputs a corrected image signal to the image processing engine 206. The random noise correction is to be described in detail later.

In step S16, the CPU 211 issues an image processing execution instruction to the image processing engine 206 so as to engage it in the image processing described earlier. In step S17, the CPU 211 issues an image compression processing execution instruction to the compression circuit 207 so as to engage it in the image compression processing described earlier. In step S18, the CPU 211 issues an instruction for the memory I/F 209 to record an image file containing the image data having undergone the compression processing into the recording medium 250. Upon issuing the last instruction to the memory I/F, the processing shown in FIG. 3 ends.

(Random Noise Correction)

Figure 4:
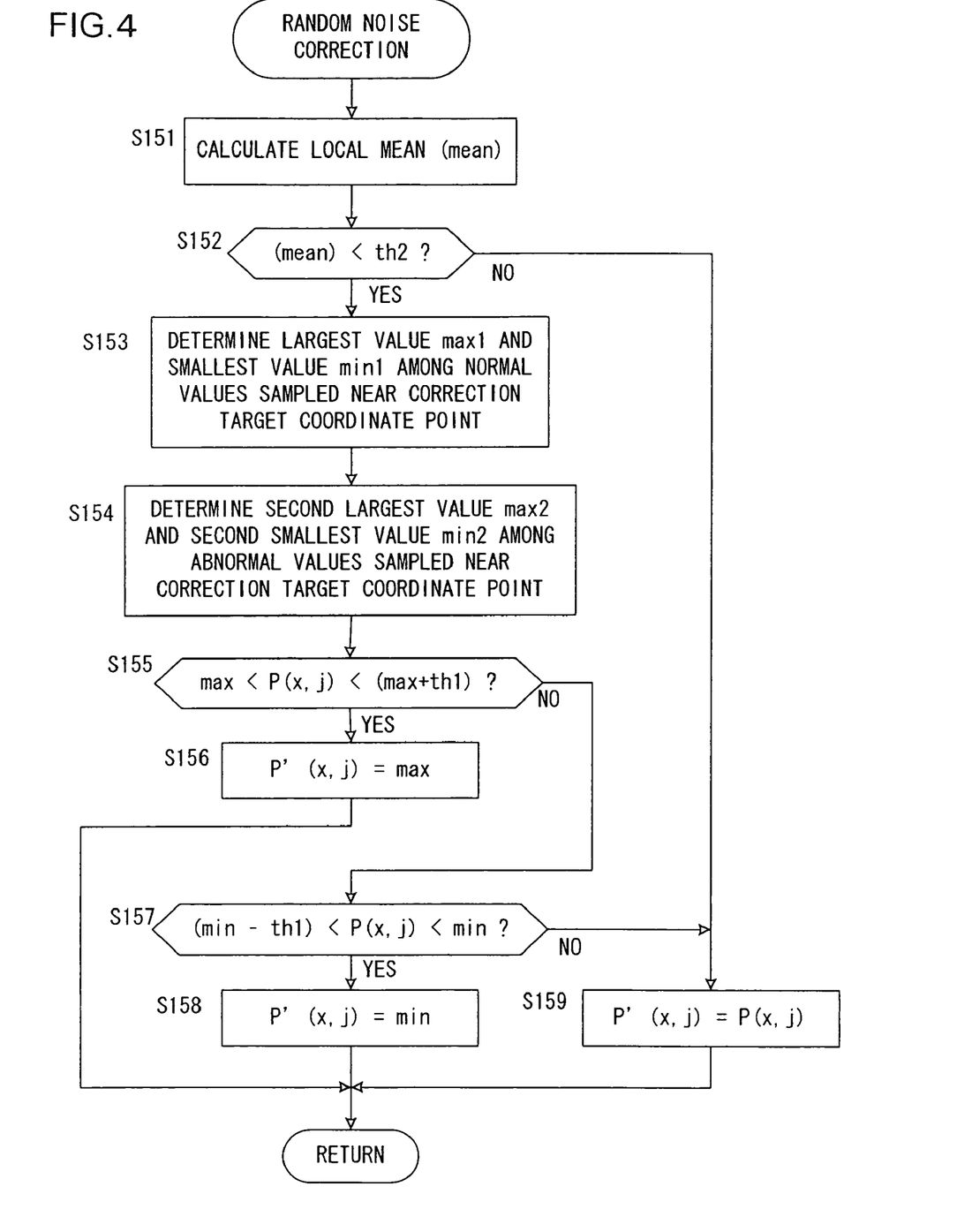
FIG. 4 presents a detailed flowchart of the random noise correction.

In reference to the flowchart in FIG. 4, the random noise correction is described in detail. The random noise correction processing unit 205a executes random noise correction for a pixel row likely to contain spike noise by sequentially switching the correction target coordinate point, e.g., by starting with the pixel taking up the uppermost position in the pixel row and ending with the pixel taking up the lowermost position in the pixel row. The CPU 211 reads out from the ROM 212 the electronic camera inherent information indicating any pixel rows likely to contain spike noise and then specifies a random noise correction target pixel row based upon the inherent information thus read out.

Figure 5:
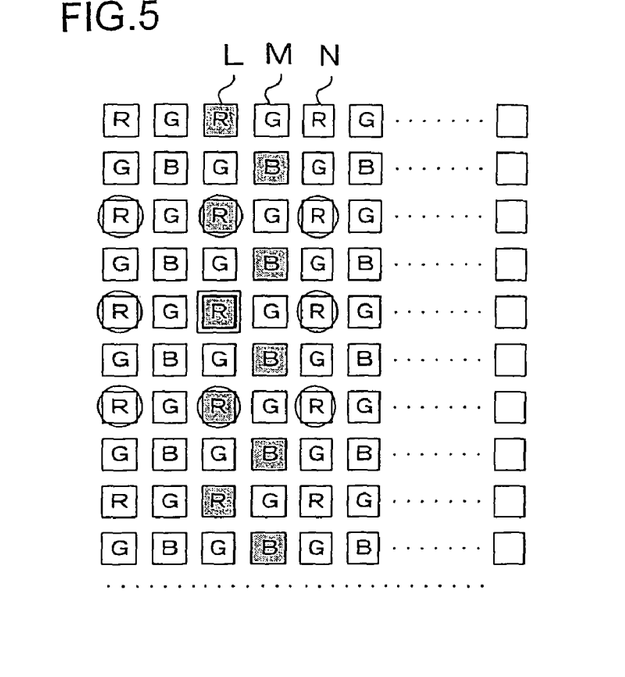
FIGS. 5 through 9 each illustrate the correction target coordinate point and reference coordinate points present around the correction target coordinate point.

In step S151 in FIG. 4, the random correction processing unit 205a calculates a local mean value (mean). FIG. 5 shows the correction target coordinate point and the reference coordinate points present around the correction target coordinate point. In FIG. 5, the pixel located at the correction target coordinate point P(x, j) in column L undergoing R-color component signal correction is enclosed in a quadrangular frame, whereas pixels located at reference coordinate points to be used to calculate the local mean, are enclosed in circular frames.

The random noise correction processing unit 205a calculates the local mean as expressed in (1) below.

$$(\text{mean}) = \frac{\left\{\begin{array}{c}P(x-2, j-2) + P(x-2, j) + P(x-2, j+2) + \\ P(x, j-2) + P(x, j) + P(x, j+2) + P(x+2, j-2) + \\ P(x+2, j) + P(x+2, j+2)\end{array}\right\}}{9} \quad (1)$$

Expression (1) is used to calculate the local mean when the color filters are disposed in the Bayer array. Expression (1) indicates the coordinate points taken up by pixels, which output color component signals (R-color component signals) representing the color matching that of the color component signal output from the pixel at the correction target coordinate point, and located around the correction target coordinate point, above, below, to the left, to the right and on the diagonals, are assigned as reference coordinate points.

In step S152, the random noise correction processing unit 205a makes a decision as to whether or not a specific relationship expressed as ((mean)<th2) exists with regard to the local mean (mean) and the decision threshold value th2. If an affirmative decision is made, the random noise correction processing unit 205a executes random noise correction in step S153 and subsequent steps. If, on the other hand, a negative decision is made, the random noise correction processing unit 205a gets the processing proceeding to step S159. In this case, the ratio of the spike noise is less than the predetermined value (e.g., 20%) and, accordingly, it does not execute the random noise correction as explained later.

Figure 6:
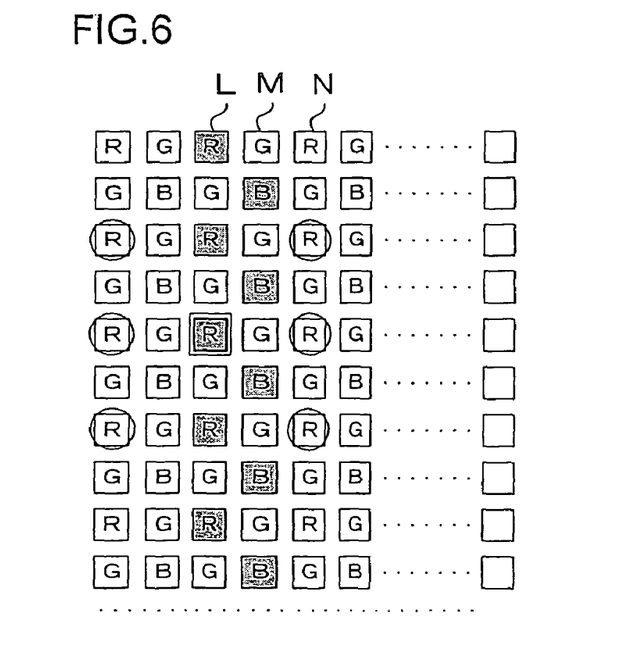

In step S153, the random noise correction processing unit 205a determines the largest value and the smallest value among normal values sampled near the correction target coordinate point. The term "normal values" in this context refers to pixel signal values sampled from pixel rows other than the pixel row likely to contain spike noise (hereafter referred to as spike noise-free pixel rows) and assigns the largest value and the smallest value as a maximum value max1 and a minimum value min1. FIG. 6 shows the correction target coordinate point and the reference coordinate points present around the correction target coordinate point. In FIG. 6, the pixel located at the correction target coordinate point P(x, j) in column L undergoing R-color component signal correction is enclosed in a quadrangular frame, whereas pixels located at reference coordinate points to be used to determine the maximum value max1 and the minimum value min1 are enclosed in circular frames. The pixels located at the reference coordinate points are included in the spike noise-free pixel rows, in close proximity to the correction target coordinate point, to the left and to the right relative to the correction target coordinate point. Color component signals (R-color component signals) representing the same color as the color represented by the color component signal from the correction target pixel are output from the pixels located at the reference coordinate points. In conjunction with color filters disposed in the Bayer array, the random noise correction processing unit 205a determines the maximum value max1 and a minimum value min1 among the pixel signal values indicated in the signals output from the pixels located at reference coordinate points P (x−2, j−2), P(x−2, j), P(x−2, j+2), P(x+2, j−2), P(x+2, j) and P(x+2, j+2).

Figure 7:
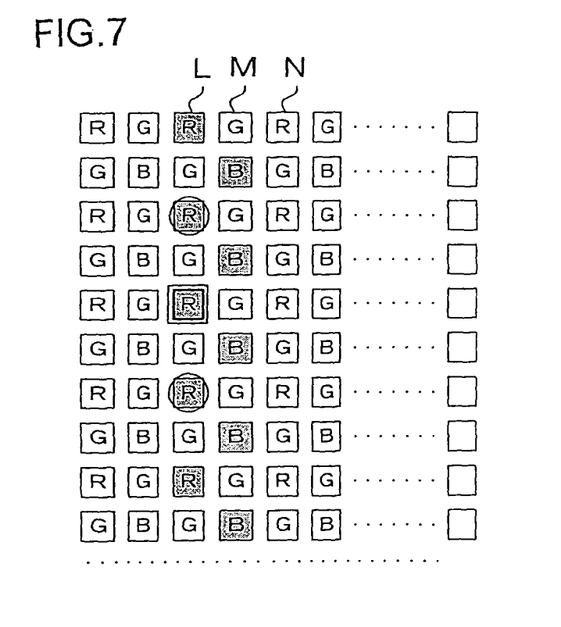

In step S154, the random noise correction processing unit 205a determines the second largest value and the second smallest value among abnormal values sampled near the correction target coordinate point and assigns them respectively as max2 and min2. The term "abnormal values" in this context refers to pixel signal values output from a pixel row likely to contain spike noise. FIG. 7 shows the correction target coordinate point and the reference coordinate points present around the correction target coordinate point. In FIG. 7, the pixel located at the correction target coordinate point P(x, j) in column L undergoing R-color component signal correction is enclosed in a quadrangular frame, whereas pixels located at reference coordinate points to be used to determine the largest value max2 and the smallest value min2 are enclosed in a circular frame. The pixels located at the reference coordinate points are present in the same pixel row (i.e., the pixel row likely to contain spike noise) as the pixel taking up the correction target coordinate point, and outputs color component signals (R-color component signals) representing the same color as the color represented by the color component signal from the correction target pixel. In conjunction with color filters disposed in the Bayer array, the random noise correction processing unit 205a determines the second largest value max2 and the second smallest value min2 among the pixel signal values indicated in the signals output from the pixels located at reference coordinate points P(x, j−2) and P(x, j+2).

In step S155, the random noise correction processing unit 205a makes a decision as to whether or not a relationship expressed as (max<P(x, j)<(max+th1)) exists with regard to the pixel signal value indicated at the pixel at the correction target coordinate point. In the relationship, max is either max1 or max2, whichever indicates the larger value. If an affirmative decision is made, the random noise correction processing unit 205a gets the processing proceeding to step S156, whereas if a negative decision is made, the operation proceeds to step S157.

In step S156, the random noise correction processing unit 205a sets a corrected signal value P'(x, j)=max and then the processing shown in FIG. 4 ends.

In step S157, the random noise correction processing unit 205a makes a decision as to whether or not a relationship expressed as ((min−th1)<P(x, j)<min) exists with regard to the pixel signal value indicated at the pixel at the correction target coordinate point. In the relationship, min is either min1 or min2, whichever indicates the smaller value. If an affirmative decision is made, the random noise correction processing unit 205a get the processing proceeding to step S158, whereas if a negative decision is made, the operation proceeds to step S159.

In step S158, the random noise correction processing unit 205a sets a corrected signal value P'(x, j)=min and then the processing shown in FIG. 4 ends. In step S159, the random noise correction processing unit 205a sets a corrected signal value P'(x, j)=P(x, j) and then the processing shown in FIG. 4 ends. The pre-correction pixel signal value is directly used to substitute for the corrected pixel signal value in step S159. In other words, the processing in step S159 is equivalent to executing no random noise correction.

While an explanation is given above on the correction executed on an R-color component signal in column L, a B component signal in column M can be corrected in much the same way.

In the embodiment, a plurality of sets of data, each made up with a decision threshold value th1 and a decision threshold value th2, are stored in the ROM 212 as table data. One of the plurality of sets of data is to be read out in correspondence to a specific level of temperature indicated in the temperature information for the image sensor 202, which is generated based upon the temperature detection signal output from the temperature sensor 214. For instance, nine sets of decision threshold values th1(t) and th2(t) (t=1, 2, . . . 9) may be stored in increments of 5° C. within a range of 0° C. through 40° C. In the embodiment, a plurality of sets of decision threshold values are provided in correspondence to varying levels of temperature in order to correct any adverse effect attributable to a change in the dark current flowing through the photo diodes installed at the image sensor 202. The dark current flowing through the photo diodes increases as the temperature rises.

The random noise correction processing unit 205a obtains the temperature information pertaining to the image sensor 202 from the CPU 211 and then executes the correction processing operation by using the decision threshold values read out from the ROM 212 in correspondence to the temperature information.

The embodiment described above makes it possible to execute optimal correction even when noise similar to the noise manifesting at the pixel located at the correction target coordinate point occurs at a pixel located at a reference coordinate point. Specific advantages of the embodiment are listed below.

(1) The electronic camera prevents image quality degradation attributable to spike noise present in image signals through smoothing. It executes different corrections when smoothing image data by referencing pixel signal values output from pixel rows, in any of which the pixel located at the correction target coordinate point in the image is not present (normal, spike noise-free pixel signal values) and when smoothing image data by referencing pixel signal values output from the pixel row containing the pixel located at the correction target coordinate point (pixel signal values that may contain spike noise). More specifically, when spike noise is present in the pixel row containing the pixel located at the correction target coordinate point, pixel signal values output from the pixels located at least at one type of reference coordinate point, set in close proximity around the correction target coordinate points, are invariably referenced. As a result, an image containing a linear pattern rendered by pixel rows containing pixels adjacent to each other and indicating large or small pixel signal values, can be corrected by specifically smoothing only the pixel signal values containing spike noise while retaining the data in the pixel rows expressing the linear pattern. Consequently, the extent to which the spike noise affects the image quality can be optimally controlled.

(2) During the smoothing processing executed via the max-min filter, the largest pixel signal value is assigned as max1 when referencing the pixel signal values (normal, spike noise-free pixel signal values) output from pixel rows that do not include the pixel located at the correction target coordinate point, whereas the second largest pixel signal value is assigned as max2 when referencing the pixel signal values output from the same pixel row as that containing the pixel located at the correction target coordinate point (pixel signal values that may contain spike noise). The maximum value max used in the smoothing processing is either the largest value max1 or the second largest value max2, whichever indicates the larger value. Namely, whenever there is a likelihood of the target image data containing spike noise, the target image data are smoothed so as to assume a value close to the second largest pixel signal value instead of the largest pixel signal value that is most likely to contain spike noise, whereas when there is no likelihood of the target image data containing spike noise, the target image data are smoothed so as to assume a value closer to the largest pixel signal value.

(3) The smoothing processing is not executed if the pixel signal value output from the pixel located at the correction target coordinate point is larger than the value obtained by adding the decision threshold value th1 to the maximum value max. Consequently, any original linear texture in the initial image rendered via linear pixel rows with the pixels therein adjacent to each other indicating large pixel signal values, shall not be lost.

(4) During the smoothing processing executed via the max-min filter, the smallest pixel signal value is assigned as min1 when referencing the pixel signal values (normal, spike noise-free pixel signal values) output from pixel rows that do not include the pixel located at the correction target coordinate point, whereas the second smallest pixel signal value is assigned as min2 when referencing the pixel signal values output from the same pixel row as that containing the pixel located at the correction target coordinate point (pixel signal values that may contain spike noise). The minimum value min used in the smoothing processing is either the smallest value min1 or the second smallest value min2, whichever indicates the smaller value. Namely, whenever there is a likelihood of the target image data containing spike noise, the target image data are smoothed so as to assume a value close to the second smallest pixel signal value instead of the smallest pixel signal value that is most likely to contain spike noise, whereas when there is no likelihood of the target image data containing spike noise, the image data are smoothed so as to assume a value closer to the smallest pixel signal value.

(5) The smoothing processing is not executed if the pixel signal value output from the pixel located at the correction target coordinate point is smaller than the value obtained by subtracting the decision threshold value th1 from the minimum value min. Consequently, any original linear texture in the initial image, rendered via linear pixel rows with the pixels therein adjacent to each other indicating small pixel signal values, shall not be lost.

(6) Since the decision threshold value th1 is determined based upon the standard deviation of the image signals output from the image sensor 202, the correction can be executed without being readily affected by variance among the elements constituting the pixel sensor matrix. In addition, since the decision threshold value used in the smoothing processing is selected in correspondence to the temperature at the image sensor 202, the processing can be executed without being readily affected by fluctuations in the temperature at the image sensor 202.

(7) The smoothing processing is executed if the local mean (mean) of the values indicated in the pixel signals output from pixels located at the correction target coordinate point and located near the correction target coordinate point is smaller than the decision threshold value th2, whereas the smoothing processing is not executed if the local mean (mean) is larger than the decision threshold value th2. In other words, the smoothing processing is executed selectively only under conditions in which spike noise would otherwise manifest noticeably. As a result, the processing load is reduced and linear textures do not become lost through indiscriminate smoothing.

(8) The decision threshold value th2 is determined based upon the signal values indicated in all the image signals output from the image sensor 202 and thus, the correction can be executed without being readily affected by the variance among the elements constituting the pixel sensor matrix. In addition, since the decision threshold value used in the smoothing processing is selected in correspondence to the temperature at the image sensor 202, the processing can be executed without being readily affected by fluctuations in the temperature at the image sensor 202.

(Variation 1)

In the example described above, different sets of values each made up with decision threshold values th1 and th2 to be selected in correspondence to a specific temperature level among various temperature levels are stored in advance in the ROM 212 and the values corresponding to the current temperature at the image sensor 202 are read out from the ROM 212 and are used in the processing. Instead, the values corresponding to the temperature at which spike noise manifests to the greatest increase among the values corresponding to various temperature levels, may be stored in advance in the ROM 212 and the values corresponding to the temperature at which the spike noise manifests to the greatest increases may be read out and used in the smoothing processing.

(Variation 2)

While an explanation is given above on an example in which primary color filters are disposed in the Bayer array at the image sensor 202, the present invention may be adopted in an image sensor equipped with complementary color filters. In addition, the present invention may be adopted in conjunction with a color filter array other than the Bayer array, such as the Delta array. When the present invention is adopted in conjunction with a color filter array other than the Bayer array, reference coordinate points should be adjusted so that the coordinate points taken up by pixels which output color component signals representing the color matching that of the color component signal output from the pixel at the correction target coordinate point are assigned as reference coordinate points.

(Variation 3)

Figure 8:
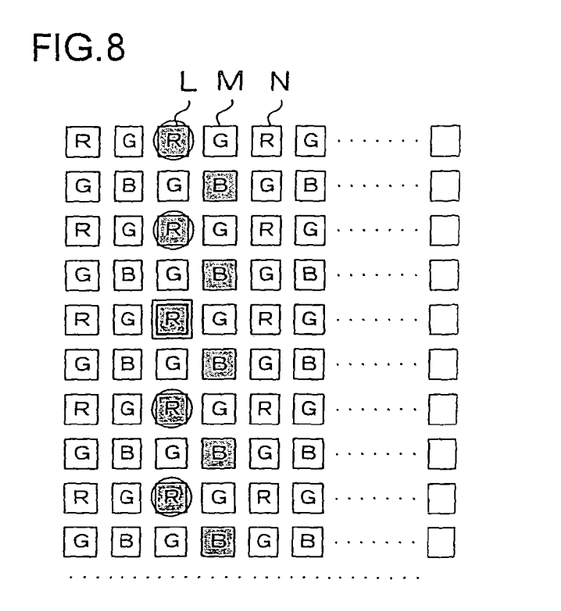

While the abnormal values max2 and min2 near the correction target coordinate point are detected at the pixels located at two reference coordinate points in step S154, they may be selected from pixel signal values at pixels located at four reference coordinate points, instead. Under such circumstances, a second largest abnormal value maybe assigned as max2 and a second smallest abnormal value may be assigned as min2. FIG. 8 shows the correction target coordinate point and the reference coordinate points present around the correction target coordinate point. In FIG. 8, the pixel located at the correction target coordinate point P(x, j) in column L undergoing R-color component signal correction is enclosed in a quadrangular frame, whereas the pixels located at reference coordinate points to be used to determine the second largest abnormal value max2 and the second smallest abnormal value min2 are enclosed in circular frames.

When the correction processing is executed on image data output from an image sensor assuming the Bayer color filter array, the random noise correction processing unit 205*a* determines the second largest value max2 and the second smallest value min2 among the pixel signal values output from the pixels located at reference coordinate points P(x, j−4), P(x, j−2), P(x, j+2) and P(x, j+4). In this case, the coordinate points of the pixels present in the same pixel row as the pixel located at the correction target coordinate point (i.e., the pixel row that may contain spike noise), which output color component signals (R-color component signals) representing the color matching the color component represented in the color component signal output from the correction target pixel and take up two positions above and two positions below the correction target coordinate point, are assigned as reference coordinate points. Other aspects of the processing are similar to those in the embodiment described earlier.

By adopting variation 3, the loss of image texture through smoothing can be even more effectively prevented and, at the same time, the increase to which image data are adversely affected by spike noise can be further reduced.

(Variation 4)

In variation 4, the coordinate pints of the pixels present in the same pixel row as the pixel located at the correction target coordinate point (i.e., the pixel row that may contain spike noise), which output color component signals (R-color component signals) representing the color matching the color component represented by the color component signal output from the target pixel and take up two positions above the correction target coordinate point in close proximity to the correction target coordinate point, are assigned as reference coordinate points. The second largest value and the second smallest value among the pixel signal values indicated at the pixels located at these reference coordinate points are respectively assigned as max2 and min2. The coordinate points of pixels the present in the same pixel row as the pixel located at the correction target coordinate point (i.e., the pixel row that may contain spike noise), which output color component signals (R-color component signals) representing the color matching the color component represented by the color component signal output from the target pixel and take up two positions below the correction target coordinate point in close proximity to the correction target coordinate point, are assigned as reference coordinate points. The second largest value and the second smallest value among the pixel signal values indicated at the pixels located at these reference coordinate points are respectively assigned as max3 and min3.

Figure 9:
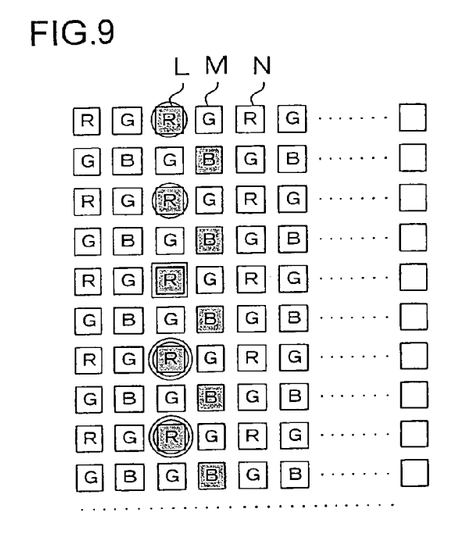

FIG. 9 shows the correction target coordinate point and the reference coordinate points present around the correction target coordinate point. In FIG. 9, the pixel located at the correction target coordinate point P(x, j) in column L undergoing R-color component signal correction is enclosed in a quadrangular frame, whereas the reference coordinate points taken up by the pixels that output the second largest pixel signal value max2 and the second smallest pixel signal value min2 above the correction target coordinate point are enclosed inside circular frames. The reference coordinate points taken up by the pixels that output the second largest pixel signal value max3 and the second smallest pixel signal value min3 below the correction target coordinate point are enclosed inside double circular frames.

In variation 4, the CPU 211 assigns the largest value among max1, max2 and max3 as the maximum value max to be used in the smoothing processing. The CPU 211 also assigns the smallest value among min1, min2 and min3 as the minimum value min to be used in the smoothing processing. Other aspects of the processing are similar to those in the embodiment described earlier.

By adopting variation 4, the loss of image texture through smoothing can be even more effectively prevented and, at the same time, the increase to which image data are adversely affected by spike noise can be further reduced.

Figure 10:
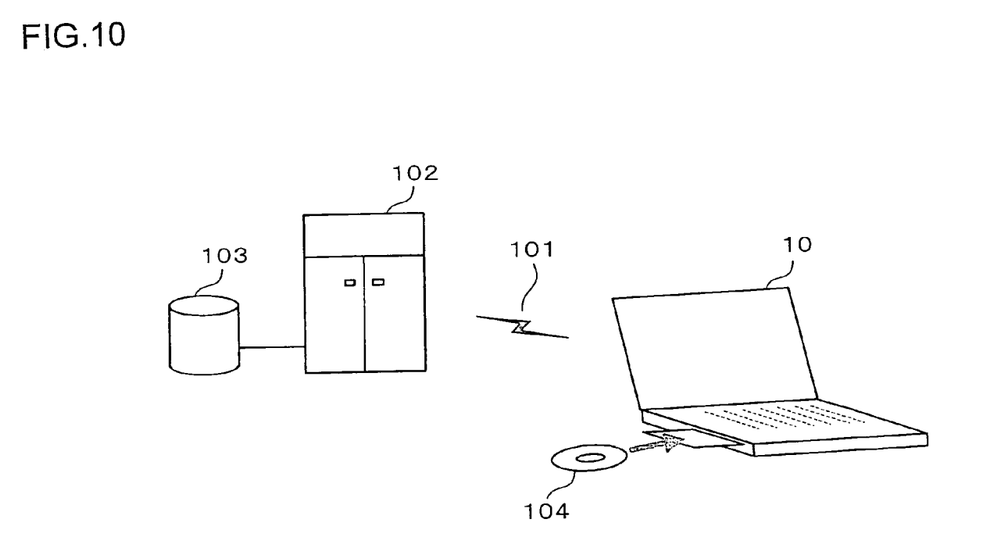
FIG. 10 illustrates how the image processing program in the image processing program product achieved in an embodiment of the present invention may be loaded into a personal computer.

While an explanation is given above on an example in which the random noise correction is executed inside the electronic camera, an image processing apparatus capable of suppressing the adverse effect of spike noise maybe configured by engaging a personal computer 10 in the execution of an image processing program that enables the processing in steps S3 through S15 (see FIG. 3) as shown in FIG. 10. Such an image processing program is loaded into the data storage device of the personal computer 10, which functions as the image processing apparatus while the CPU 211 executes processing based upon the image processing program.

The image processing apparatus reads image files containing images photographed with the electronic camera and the electronic camera inherent information indicating any pixel sensor column corresponding to a pixel row that may contain spike noise and the decision threshold values th1 and th2 stored in the ROM 212. The image processing apparatus then executes the random noise correction on the images it has read out by using the camera inherent information.

FIG. 10 shows how the image processing program provided in the image processing program product achieved in an embodiment of the present invention may be loaded into the personal computer 10. The image processing program may be loaded into the personal computer 10 by loading a recording medium 104, such as a CD-ROM, having stored therein the image processing program, into the personal computer 10 or it may be downloaded to the personal computer 10 as a data signal via a communication network 101. In the latter case, the image processing program should be stored in advance at a hard disk device 103 or the like at a server (computer) 102 connected to the communication network 101. In short, the image processing program may be provided as a computer program product adopting any of various modes including the recording medium 104 having recorded therein the image processing program and the data signal transmitted via the communication network 101.

The above described embodiments are examples, and various modifications can be made without departing from the scope of the invention.

What is claimed is:

1. An image processing apparatus comprising:
    an information acquisition unit that obtains position information from a memory indicating a position of a first pixel group made up with pixels set along a predetermined direction among a plurality of pixels constituting an image; and
    a processor including:
        a smoothing processing unit that executes smoothing processing on pixel values indicated at the pixels in the first pixel group; and
        a control unit that controls the smoothing processing unit so that the smoothing processing unit executes the smoothing processing differently when using pixel values indicated at least at some pixels in the first pixel group during the smoothing processing and when using pixel values indicated at least at some pixels in a second pixel group among the plurality of pixels during the smoothing processing, the second pixel group being different from the first pixel group wherein:
        the smoothing processing unit assigns either an nth (n≧2) largest pixel value among pixel values indicated at pixels in the first pixel group present near a target pixel undergoing the smoothing processing or a largest pixel value among pixel values indicated at pixels in the second pixel group, present near the target pixel undergoing the smoothing processing whichever assumes a larger value, as a reference maximum value, and corrects a pixel value at the target pixel to a smaller value if the pixel value indicated at the target pixel is larger than the reference maximum value.

2. An image processing apparatus according to claim 1, wherein:
    the smoothing processing unit corrects a pixel value at the target pixel to a smaller value if the pixel value at the target pixel undergoing the smoothing processing is smaller than a sum of the reference maximum value and a predetermined value.

3. An image processing apparatus according to claim 2, wherein:
    the predetermined value is set based upon noise data with regard to noise occurring in an image-capturing device that captures the image.

4. An image processing apparatus according to claim 3, wherein:
    the smoothing processing unit adjusts the predetermined value based upon temperature information obtained when the image is captured.

5. An image processing apparatus according to claim 1, wherein:
    the first pixel group contains more noticeable noise than the second pixel group.

6. An image processing apparatus comprising:
    an information acquisition unit that obtains position information from a memory indicating a position of a first pixel group made up with pixels set along a predetermined direction among a plurality of pixels constituting an image; and
    a processor including:
        a smoothing processing unit that executes smoothing processing on pixel values indicated at the pixels in the first pixel group; and
        a control unit that controls the smoothing processing unit so that the smoothing processing unit executes the smoothing processing differently when using pixel values indicated at least at some pixels in the first pixel group during the smoothing processing and when using pixel values indicated at least at some pixels in a second pixel group among the plurality of pixels during the smoothing processing, the second pixel group being different from the first pixel group wherein:
        the smoothing processing unit assigns either an nth (n≧2) smallest pixel value among pixel values indicated at pixels in the first pixel group present near a target pixel undergoing the smoothing processing or a smallest pixel value among pixel values indicated at pixels in the second pixel group present near the target pixel undergoing the smoothing processing whichever assumes a smaller value, as a reference minimum value, and corrects a pixel value at the target pixel to a larger value if the pixel value indicated at the target pixel undergoing the smoothing processing is smaller than the reference minimum value.

7. An image processing apparatus according to claim 6, wherein:
    the smoothing processing unit corrects a pixel value at the target pixel undergoing the smoothing processing to a larger value if the pixel value at the target pixel undergoing the smoothing processing is larger than a difference obtained by subtracting a predetermined value from the reference minimum value.

8. An image processing apparatus according to claim 6, wherein:
    the first pixel group contains more noticeable noise than the second pixel group.

9. An image processing apparatus comprising:
    an information acquisition unit that obtains position information from a memory indicating a position of a first pixel group made up with pixels set along a predetermined direction among a plurality of pixels constituting an image;

a processor including:
- a smoothing processing unit that executes smoothing processing on pixel values indicated at the pixels in the first pixel group; and
- a control unit that controls the smoothing processing unit so that the smoothing processing unit executes the smoothing processing differently when using pixel values indicated at least at some pixels in the first pixel group during the smoothing processing and when using pixel values indicated at least at some pixels in a second pixel group among the plurality of pixels during the smoothing processing, the second pixel group being different from the first pixel group wherein:

the smoothing processing unit executes the smoothing processing if a local mean calculated based upon a pixel value at a target pixel undergoing the smoothing processing and pixel values at pixels present near the target pixel in the image is smaller than a predetermined decision threshold value.

10. An image processing apparatus according to claim 9, wherein:
the decision threshold value is set based upon noise data with regard to noise occurring in an image-capturing device that captures the image.

11. An image processing apparatus according to claim 9, wherein:
the first pixel group contains more noticeable noise than the second pixel group.

12. A camera equipped with an image processing apparatus according to claim 1.

13. A non-transitory computer-readable storage medium comprising:
an image processing program that controls a processor, the image processing program including instructions that cause the processor to:
- obtain position information from a memory indicating a position of a first pixel group made up with pixels disposed along a predetermined direction among a plurality of pixels constituting an image;
- obtain a first reference value by using pixel values indicated at least at some pixels in a first pixel group;
- obtain a second reference value by using pixel values indicated at least at some pixels in a second pixel group among the plurality of pixels, which is different from the first pixel group; and
- smooth a pixel value at a target pixel in the first pixel group by using the first reference value and the second reference value if a local mean calculated based upon the pixel value at the target pixel and pixel values at pixels present near the target pixel in the image is smaller than a predetermined decision threshold value.

14. An image processing method for use with a processor, the method comprising:
- obtaining position information from a memory indicating a position of a first pixel group made up with pixels disposed along a predetermined direction among a plurality of pixels constituting an image;
- obtaining a first reference value by using pixel values indicated at least at some pixels in the first pixel group using the processor;
- obtaining a second reference value by using pixel values indicated at least at some pixels in a second pixel group among the plurality of pixels, which is different from the first pixel group, using the processor; and
- smoothing a pixel value at a target pixel in the first pixel group by using the first reference value and the second reference value using the processor if a local mean calculated based upon the pixel value at the target pixel and pixel values at pixels present near the target pixel in the image is smaller than a predetermined decision threshold value.

15. A camera equipped with an image processing apparatus according to claim 6.

16. A camera equipped with an image processing apparatus according to claim 9.

* * * * *